United States Patent
Baba et al.

(10) Patent No.: US 9,021,774 B2
(45) Date of Patent: May 5, 2015

(54) PACKAGING AND FILLING MACHINE

(75) Inventors: Tsuyoshi Baba, Tokyo (JP); Hidetoshi Konno, Tokyo (JP); Hitoshi Matsumoto, Tokyo (JP)

(73) Assignee: Tetra Laval Holdings & Finance S.A., Pully (CH)

( * ) Notice: Subject to any disclaimer, the term of this patent is extended or adjusted under 35 U.S.C. 154(b) by 1149 days.

(21) Appl. No.: 12/996,799

(22) PCT Filed: Jun. 9, 2008

(86) PCT No.: PCT/JP2008/001468
§ 371 (c)(1),
(2), (4) Date: Mar. 11, 2011

(87) PCT Pub. No.: WO2009/150693
PCT Pub. Date: Dec. 17, 2009

(65) Prior Publication Data
US 2011/0154779 A1    Jun. 30, 2011

(51) Int. Cl.
*B65B 9/20*    (2012.01)
*B65B 57/14*    (2006.01)
(Continued)

(52) U.S. Cl.
CPC .............. *B65B 57/145* (2013.01); *B29C 65/02* (2013.01); *B29C 65/7451* (2013.01); *B29C 66/038* (2013.01); *B29C 66/0384* (2013.01); *B29C 66/1122* (2013.01); *B29C 66/4312* (2013.01); *B29C 66/71* (2013.01);
(Continued)

(58) Field of Classification Search
CPC .......... B65B 9/12; B65B 9/20; B65B 9/2049; B65B 51/06; B65B 61/24
USPC ................................................... 53/551, 552
See application file for complete search history.

(56) References Cited

U.S. PATENT DOCUMENTS 3,626,997 A * 12/1971 Whitaker et al. .................. 141/9
4,958,665 A *  9/1990 Iwano ............................. 141/95
(Continued)

FOREIGN PATENT DOCUMENTS

DE    2334359 A1 *  1/1975  .............. B65B 51/06
DE    3244372 A1 *  6/1984  .............. B65B 51/06
(Continued)

OTHER PUBLICATIONS

International Search Report (PCT/ISA/210) issued on Aug. 19, 2008, by Japanese Patent Office as the International Searching Authority for International Application No. PCT/JP2008/001468.

*Primary Examiner* — Stephen F Gerrity
(74) *Attorney, Agent, or Firm* — Buchanan Ingersoll & Rooney P.C.

(57) ABSTRACT

A packaging and filling apparatus for keeping pressure of filled liquid food in a tube at positive pressure, facilitating preformation by a forming flap, and preventing an external ambient substance from entering the tube even if the liquid food pressure lowers to negative pressure by a fluctuation of the liquid food pressure is described. The apparatus has a pressure flange provided below a liquid level in a tubular packaging material and along an outer periphery of a filling pipe. The pressure flange prevents the liquid food in the tube from freely flowing up from the lower part to keep the pressure of the liquid food positive in the tube below the pressure flange thereby facilitating the preformation by the forming flap. The apparatus closes a gap occurring on a seam serving as a vertical sealed part or a portion where the gap might occur.

4 Claims, 6 Drawing Sheets

(51) Int. Cl.
| | |
|---|---|
| *B29C 65/02* | (2006.01) |
| *B29C 65/74* | (2006.01) |
| *B29C 65/00* | (2006.01) |
| *B65B 9/12* | (2006.01) |
| *B65B 9/22* | (2006.01) |
| *B65B 51/06* | (2006.01) |
| *B65B 51/30* | (2006.01) |
| *B65B 55/02* | (2006.01) |
| *B65B 55/10* | (2006.01) |
| *B65B 61/28* | (2006.01) |
| *B29K 305/02* | (2006.01) |
| *B29K 711/12* | (2006.01) |
| *B29L 9/00* | (2006.01) |
| *B29L 31/00* | (2006.01) |
| *B65B 61/18* | (2006.01) |
| *B65B 61/24* | (2006.01) |

(52) U.S. Cl.
CPC .... *B29C 66/72321* (2013.01); *B29C 66/72328* (2013.01); *B29C 66/7373* (2013.01); *B29C 66/81427* (2013.01); *B29C 66/81431* (2013.01); *B29C 66/8491* (2013.01); *B29C 66/98* (2013.01); *B29K 2305/02* (2013.01); *B29K 2711/123* (2013.01); *B29K 2995/0069* (2013.01); *B29L 2009/00* (2013.01); *B29L 2031/7162* (2013.01); *B65B 9/12* (2013.01); *B65B 9/20* (2013.01); *B65B 9/2035* (2013.01); *B65B 9/2049* (2013.01); *B65B 9/22* (2013.01); *B65B 51/06* (2013.01); *B65B 51/30* (2013.01); *B65B 55/025* (2013.01); *B65B 55/103* (2013.01); *B65B 61/184* (2013.01); *B65B 61/24* (2013.01); *B65B 61/28* (2013.01)

(56) References Cited

U.S. PATENT DOCUMENTS

| | | | | |
|---|---|---|---|---|
| 5,388,387 | A * | 2/1995 | McElvy | 53/451 |
| 5,813,197 | A * | 9/1998 | Aguzzoli | 53/453 |
| 7,013,615 | B2 * | 3/2006 | Piucci, Jr. et al. | 53/167 |
| 7,093,405 | B2 * | 8/2006 | Andersson et al. | 53/167 |
| 7,389,623 | B2 * | 6/2008 | Yano et al. | 53/374.2 |
| 2003/0173022 | A1 * | 9/2003 | Futase | 156/251 |
| 2004/0027133 | A1 * | 2/2004 | Konno et al. | 324/444 |
| 2004/0074590 | A1 * | 4/2004 | Canti et al. | 156/163 |
| 2005/0060961 | A1 * | 3/2005 | Konno et al. | 53/456 |
| 2006/0105124 | A1 | 5/2006 | Kikuchi | |
| 2007/0017189 | A1 * | 1/2007 | Konno et al. | 53/551 |

FOREIGN PATENT DOCUMENTS

| | | | | | |
|---|---|---|---|---|---|
| EP | 322001 | A2 * | 6/1989 | | B65B 9/20 |
| EP | 614809 | A2 * | 9/1994 | | 141/198 |
| GB | 755169 | A * | 8/1956 | | B65B 9/20 |
| JP | 6-99914 | A | 4/1994 | | |
| JP | 10-167207 | A | 6/1998 | | |
| JP | 2003118708 | A * | 4/2003 | | B65B 9/10 |
| JP | 2004-98648 | A | 4/2004 | | |
| JP | 2007-269353 | A | 10/2007 | | |

\* cited by examiner

PACKAGING AND FILLING MACHINE

FIELD OF THE INVENTION

This invention relates to a packaging and filling machine transversal-sealing and cutting tube-shaped packaging materials filled up liquid food every container.

BACKGROUND ART

When packaged containers filled up liquid food such as milk, mineral water, tea, juice, soup, alcohol are manufactured, web-shaped laminated packaging materials are used. A packaged container is formed by sealing the packaging laminated material with heat sealing, ultrasonic sealing and the like. For example, in a packaging and filling machine, strip is joined in the edge of the packaging laminated material. The packaging laminated material is formed into a tube-shaped shape. Both end sides of the packaging material are overlaid on each other to form an overlap. The overlap is pressed by a strip covering an inner edge section face of longitudinal sealing, and the overlap is sealed with a longitudinal sealing heater along the longitudinal direction. The packaging laminated material is sealed in the transverse direction by a transversal seal device while filling up liquid food in the tube-shaped packaging laminated material, and the packaging laminated material is cut. A pillow-shaped preliminary container is formed. The preliminary container is further formed into the predetermined shape, and a packaged container is manufactured.

Figure 7:
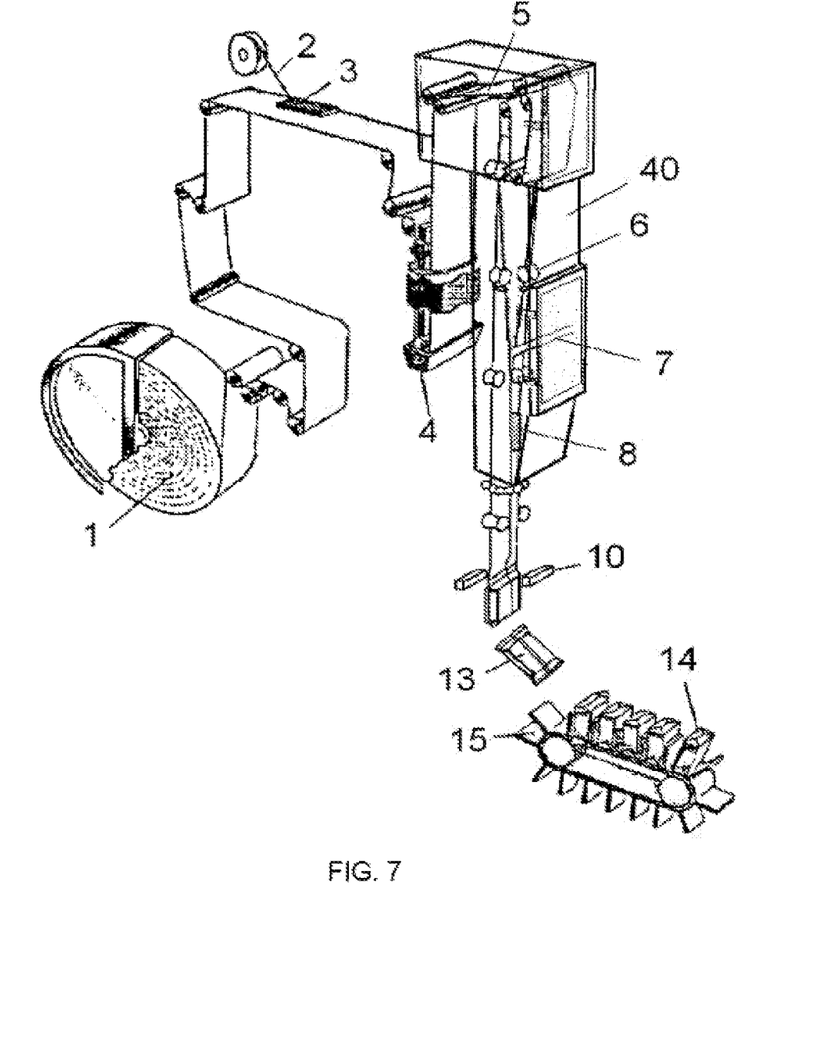
FIG. 7 is an outline perspective view showing an example of the packaging and filling machine usable in this invention.

FIG. 7 is an outline perspective diagram showing an example of a packaging and filling machine. A reel-like and web-shaped packaging laminated material 1 is loaded into the packaging and filling machine. The packaging laminated material 1 comprises a flexible laminate laminating a paper substrate and polyethylene resin layers on both sides of the paper substrate. A barrier layer including aluminum foil, gas barrier resin and the like is formed between the paper substrate and the film layer, if necessary. Decorations are printed on sections corresponding to the surface of packaged container 14.

The unwound packaging laminated material 1 is transported continually with a feeder of the transporting means, and is transported to a strip applicator 3 through bending rollers, and damper rollers. A strip 2 is continually applied onto one edge of the packaging laminated material 1 by a strip applicator 3.

A pull-tab is applied to the packaging laminated material 1, if necessary, by a pull-tab applicator. The packaging laminated material 1 is transferred to a sterilizing tank 4, and is sterilized in sterilizing tank 4 with a sterilizing liquid of hydrogen peroxide and the like. The packaging laminated material 1 is carried to an air knife 5 to be dried by the air knife 5. The packaging laminated material 1 is carried into an aseptic chamber 40 assuring that liquid food is filled up the tube-like packaging material with the aseptic atmosphere. The packaging laminated material 1 is transformed gradually with forming rings 6, and other forming rings to be formed to the tube-like shape.

The tube-like packaging laminated material 1 is preheated by hot air from a preheat means 8 of a longitudinal seal device to be sealed longitudinally. The liquid food is filled up into the tube-like packaging laminated material 1 from a bottom end of a filling pipe 7 outlet.

Figure 8:
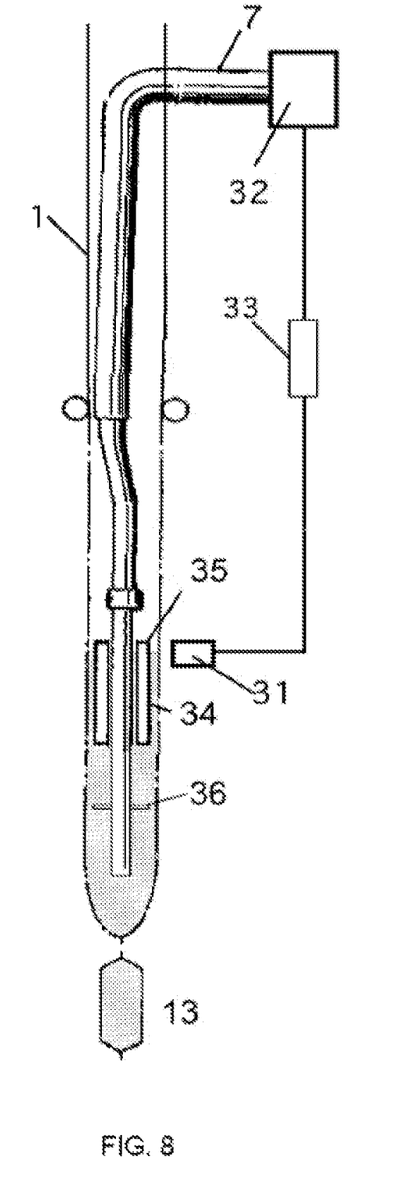
FIG. 8 is a sectional front view explaining a liquid level control of the packaging and filling machine.

An example of filling up liquid food to the predetermined liquid level from a filling pipe in a tube-like packaging material is shown in FIG. 8.

A vertical portion of the filling pipe 7 is inserted into the internal lower part of the tube-like packaging material 1. The upstream portion is connected to a control valve 32. A cylindrical float 34 is arranged around the periphery of the vertical portion of the filling pipe 7. The float 34 floating in the liquid food and being between the tube-shaped packaging material 1 and the filling pipe 7 is put around the external surface of the vertical portion of the filling pipe 7 with freely up-down movability. A means to be detected 35 (a magnet, a transmitter, a tag and the like) is installed to the float 11. A detector 31 is arranged in the outside of the tube 1. The detector 31 converts a change of the strength and the weakness of signal from the means to be detected into electric current and the detector outputs as the electric signal. The detector outputs a stop signal at more than the predetermined level and an open signal at less than the predetermined level, respectively, to a controlling means 33. A flow control valve 32 is equipped in the upstream portion of the filling pipe 7, and the flow control valve 32 is controlled by the control means 33. The liquid level of the liquid is coordinated to the predetermined level. (See, e.g., JP 01-82102 Y)

The tube-like packaging laminated material 1 is guided downward and is carried to the transversal seal device 10, as shown in FIG. 7. The tube-like packaging laminated material 1 is heat-sealed with pressure along the transverse direction, and it is formed as a container shape. The transversely sealed packaging laminated material is cut with a knife, and a pillow-like preliminary container 13 is formed.

Figure 9:
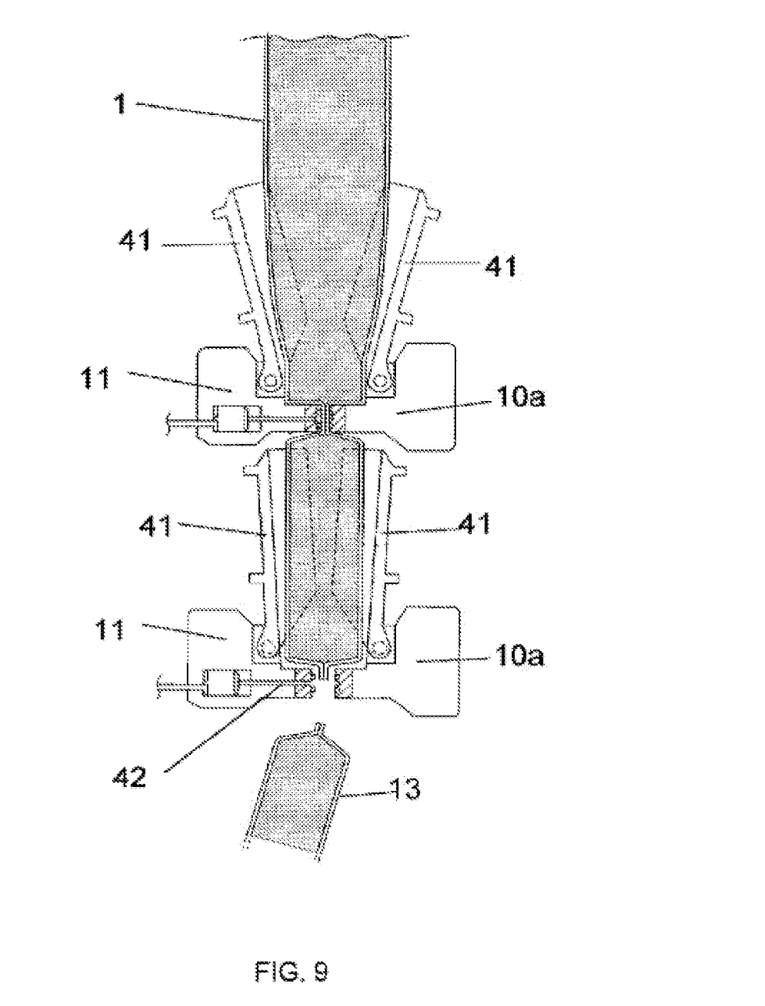
FIG. 9 is a sectional front view explaining the transversal seal device of the packaging and filling machine.

Detailed partial cross-sectional view of the transversal seal device 10 is shown for FIG. 9. At first, in this embodiment, the tube-like packaging material 1 with the filled food is held with an upper pair of seal jaws 10a and counter jaws 11. While the tube-like packaging material 1 is carried downward for a distance of the length corresponding to one packaged container, it is held by a pair of upper forming flaps 41 and 41, and it is formed as an approximate container shape. Two transversal seal zones are formed by the transversal sealing transversally. The middle of the seal zones of the connected pillow-like preforming bodies is cut by the knife 42, and separated pillow-like preformed bodies 13 are formed. In the embodiment for high-speed transversal sealing, preforming and cutting, two pairs of the seal jaw and the counter jaw, and forming flaps are equipped, and the first pair which finished the transversal sealing, preforming and cutting steps is evacuated aside, and it returns upward, next transversal sealing, preforming and cutting steps are repeated.

The preliminary container 13 is conveyed and is formed to the final shape by a final folder 15, as shown in FIG. 7, and a liquid-food filled packaged container 14 is produced.

SUMMARY OF THE INVENTION

Problem To Be Solved By The Invention

In the above-mentioned packaging and filling system, a pressure of the liquid food filled in the tube is positive pressure corresponding to a depth of the liquid from the liquid level. When the packaging material is formed with the forming flaps, the positive pressure of the liquid food in the tube cooperates with an external pressure of the forming flaps to form the packaging material well.

In addition, such positive pressure keeps the filled foods good hygienic conditions, too. That is, even if the packaging material has slight cracks, cracking and pinholes, the liquid food leaks from such points only outside, but any outside atmosphere substance does not invade the tube and does not pollute the liquid food in the tube.

It is an object of the invention to provide with a packaging and filling machine capable of easily preforming with the forming flaps by keeping the pressure of the filled liquid food in the tube the positive pressure, capable of preventing the pressure of the liquid food from dropping to negative pressure, even if the pressure of the liquid food decreases due to the changes of the liquid food pressure, and capable of preventing outside atmosphere materials from invading into the tube.

Means to Solve the Problem

In a packaging and filling machine of this invention, a web-like packaging material is fed continually and is formed to tube shapes, the tube overlapped in both ends of the packaging material is longitudinally sealed along the longitudinal direction, liquid food is filled up to a liquid level of a predetermined position above an outlet of a filling pipe from the filling pipe in the tube-like packaging material conveyed continually and vertically downward, while the tube is held with seal jaws and counter jaws along transversal direction below the liquid level, and is pulled down, the tube is transversally sealed, while the tube is held with seal jaws and counter jaws along transversal direction below the liquid level, and the tube is held with forming flaps at the same time to be preformed, the tube is cut in the transversal seal zone, and packaged containers are manufactured.

The packaging and filling machine comprises a pressure flange being arranged around the periphery of filling pipe below the liquid level in the tube-like packaging material, the pressure flange controls free flows from the lower part to the upper part about the liquid food filled in the tube to keep the pressure of the liquid food in the tube below the pressure flange a positive pressure, and to make the preforming with the forming flaps easy.

The packaging and filling machine comprises a covering means. The covering means covers a gap or the potential gap formed by splices of the longitudinal seal zone on the upstream side of points where the liquid food pressure drops due to changes of the liquid food pressure above the seal jaws, the counter jaws and the forming flaps, and the covering means prevents an invasion of external atmosphere substances to the tube due to a dropping into negative pressure of the liquid food pressure by changes of the liquid food pressure.

In preferable embodiment of this invention, the covering means is a film applying means of applying a film for covering.

In preferable embodiment of this invention, the covering means is an adhesive applying means of applying an adhesive for covering.

In preferable embodiment of this invention, the covering means is installed in the outside of an aseptic chamber assuring that the liquid food is filled up in a sterilized atmosphere into the tube-shaped packaging material.

Effects of Invention

In a packaging and filling machine of this invention, the web-like packaging material is fed continually and is formed to tube shapes, the tube overlapped in both ends of the packaging material is longitudinally sealed along the longitudinal direction, the liquid food is filled up to the liquid level of the predetermined position above the outlet of the filling pipe from the filling pipe in the tube-like packaging material conveyed continually and vertically downward, while the tube is held with the seal jaws and the counter jaws along transversal direction below the liquid level, and is pulled down, the tube is transversally sealed, while the tube is held with the seal jaws and the counter jaws along transversal direction below the liquid level, and the tube is held with the forming flaps at the same time to be preformed, the tube is cut in the transversal seal zone, and packaged containers are manufactured.

Because it is transversal sealed below the liquid level of the web-like packaging material which liquid food was filled up with, unnecessary air does not stay in a container, and good quality is kept.

In the above-mentioned packaging filling, the pressure of the liquid food filled in the tube is positive pressure in proportion to the depth of the liquid from the liquid level. When the packaging material is formed with the forming flaps, the material can be formed well under such positive pressure.

In the characteristic of this invention, the pressure flange is arranged on the periphery of the filling pipe below the liquid level in the tube-like packaging material.

While the tube-like packaging material is carried downward, the material is caught rapidly by the seal jaw and the counter jaw, and, in addition, the material is caught rapidly by a pair of the forming flaps. The liquid in the tube-like packaging material is pushed, and the pressure of the liquid food in the tube suddenly rises, and the positive pressure may be excess pressure. The excessively positive pressure rapidly raises the liquid level, and makes an unstable shakes and a difficulty of the liquid level control.

That is, this excessively positive pressure rapidly raises the liquid level, and shakes the level uncertainly. The float 34 shown in FIG. 8 shakes up and down greatly, and, as a result, a control means 33 cannot control the level.

In the invention, the pressure flange controls the free flows from the lower part to the upper part of the liquid food filled in the tube to keep the pressure of the liquid food in the tube below the pressure flange the proper positive pressure, and to make the preforming with forming flaps easy. In addition, even if the liquid food flows backwards from the lower portion to the upper portion, the backward flow can be controlled, and the rapid rise of the liquid level can be controlled.

For example, the pressure flange 36 is arranged on the periphery of filling pipe 7 below the liquid level in the tube-like packaging material 1 as shown in FIG. 8. Even if the liquid food flows backwards from the lower portion to the upper portion by the rapid holding of the seal jaws and counter jaws and by the rapid holding with a pair of the forming flaps, the pressure flange 36 can control the backward flow, and control the rapid rise of the liquid level.

In the feature of this invention, the covering means is provided, and the covering means covers a gap or the potential gap formed by splices of the longitudinal seal zone on the upstream side of points where the liquid food pressure drops due to changes of the liquid food pressure above the forming flaps. By the fluctuation/changes of the liquid food pressure, the pressure of the liquid food filled in the tube around the pressure flange is in danger of being extremely low positive pressure or negative pressure.

Figure 5A:
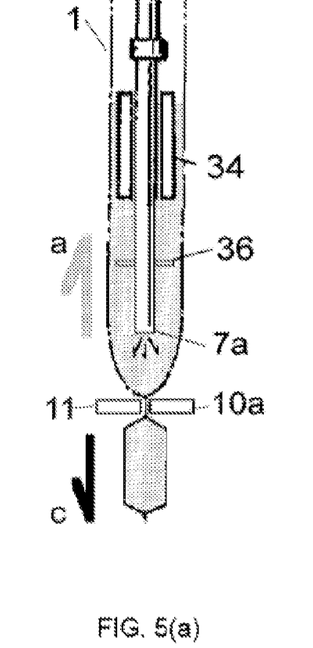
FIGS. 5(a), 5(b), and 5(c) are outline sectional views showing the operation of the packaging and filling machine below the pressure flange.

For example, as shown in FIG. 5, the tube-like packaging material 1 is downward carried in the direction of an arrow (c), around the filling pipe outlet 7a above the transversal seal device. As shown in FIG. 5 (A), the tube is rapidly caught by the forming flaps, the seal jaw 10a and the counter jaw 11, the liquid in the tube-like packaging material is pushed, and the pressure of the liquid food in the tube rapidly rises, and the liquid flows backwards in direction of arrow (a). The pressure flange 36 controls the backward flow.

Figure 5B:
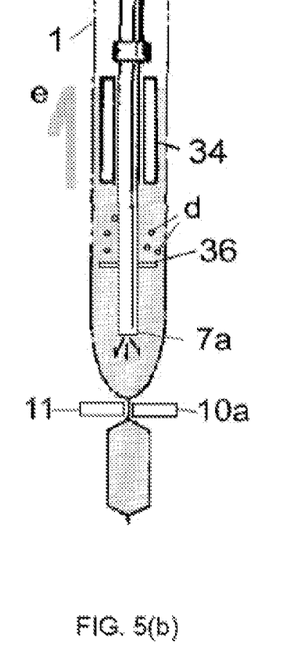

Because the pressure of the liquid food in the tube passes on the whole liquid food in the tube regardless of the existence of the pressure flange 36, as shown in FIG. 5(B), the liquid in the tube flows backwards in direction of the arrow (e) by inertia.

However, liquid movement from the lower portion to the upper portion of the flange is disturbed by the existence of pressure flange 36, and the liquid is lacked above the flange, and shortage (d) occurs. The shortage (d) is illustrated in FIG. 5(B) as virtual foams. As a result, the pressure of the liquid food filled in the tube is in danger of being extremely low positive pressure or negative pressure.

Figure 5C:
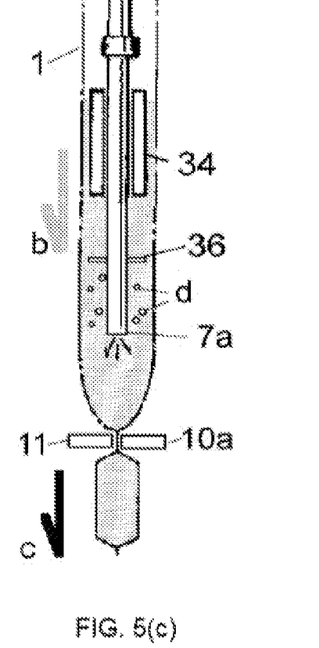

Sequentially, the tube-like packaging material is downward carried in the direction of an arrow (c), and a volume in the tube-like packaging material at the position below the pressure flange 36 increases. The liquid above the pressure flange 36 should be fed in the direction of the arrow (b) (FIG. 5 (C)), unless the liquid food corresponding to the volume increment is fed by the filling pipe exit 7a. However, the pressure flange 36 disturbs the feed. As shown in FIG. 5 (C), the volume in the tube-like packaging material at the position below the pressure flange 36 rapidly increases when the tube-like packaging material is pulled down by the seal jaw 10a and the counter jaw 11. The fed amount of the liquid food is lacked, and the shortages (d) are formed. The shortage (d) is illustrated in FIG. 5 (C) as virtual foams. As a result, the pressure of the liquid food filled in the tube is in danger of being extremely low positive pressure or negative pressure.

Figure 6:
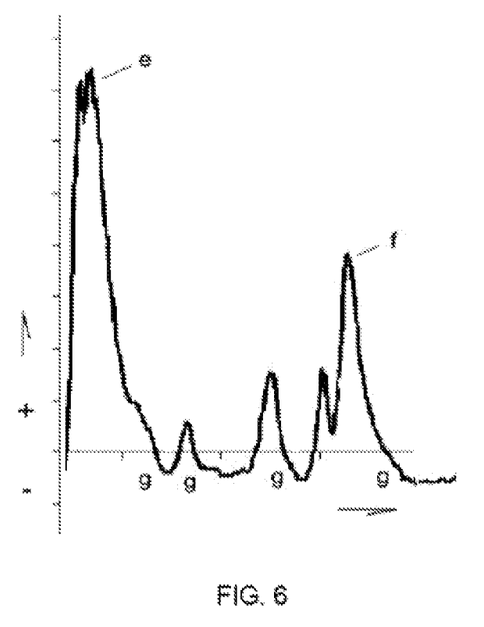
FIG. 6 is a chart with a vertical axis showing the pressure of the liquid food below the pressure flange and a cross axle showing time of one cycle of the transversal seal, preforming and cutting steps.

In an example of the packaging and filling machine, FIG. 6 is a chart with a vertical axis showing the pressure of the liquid food below the pressure flange and a cross axle showing time of one cycle of the transversal seal, preforming and cutting steps.

The pressure of the liquid food in the tube rapidly rises by the rapid holding with the forming flaps, the seal jaw and the counter. See the peaks (e) and, (f). The volume in the tube-like packaging material at the position below the pressure flange rapidly increases when the tube-like packaging material is pulled down. The fed amount of the liquid food is lacked. The pressure of the liquid food filled in the tube is in danger of being negative pressure. See the bottom (g).

In above-mentioned example, the pressure of the liquid food filled in tube is the negative pressure in the bottom (g).

In this features of the invention, the position where the covering means is installed is a position above the seal jaw, the counter jaw and the forming flap causing the change/fluctuation of the liquid food pressure. That is because there is no effect in the lower part below them, and there is no space for the installation in the operational position of the forming flap, the seal jaw and the counter jaw.

In addition, the installing position of the covering means is upstream of the dropping point of the liquid food pressure due to the change/fluctuation of the liquid food pressure. In this specification, the covering means is installed in a location with the small dropping due to the change or no dropping. In other words, the covering means is installed in the location with the positive pressure and in the upstream location of the negative pressure.

In the packaging filling system, as mentioned before, the pressure of the liquid food might be very low positive pressure or negative pressure.

In the feature of this invention, because the covering means covers a gap or the potential gap formed at the splices of the longitudinal seal zone, the covering means prevents an invasion of external atmosphere substances (pollutants) to the tube and keeps hygiene condition of the contents food.

In preferable embodiment of this invention, the covering means is a film applying means which applies a film for covering.

In this embodiment, the film applying means covers a gap or the potential gap formed at the splices of the longitudinal seal zone with a film. The film applying means prevents an invasion of external atmosphere substances, or pollutants to the liquid food in the tube and keeps the hygienic condition of the contents food.

In preferable embodiment of this invention, the covering means is an adhesive applying means which applies an adhesive for covering.

In this embodiment, the adhesive applying means covers a gap or the potential gap formed at the splices of the longitudinal seal zone with a film. The adhesive applying means prevents an invasion of external atmosphere substances, or pollutants to the liquid food in the tube and keeps hygiene condition of the contents food.

In this embodiment, the adhesive applying means covers the gap with the liquid, viscous, membranous, film-like adhesive by using a roller, a discharge jet, a spray, and nozzle.

In preferable embodiment of this invention, the covering means is installed in the outside of an aseptic chamber assuring that the liquid food is filled up in a sterilized atmosphere into the tube-shaped packaging material. The aseptic chamber has difficulty of the installation on view point of the mechanical design, the hygiene, the operation and the function. In the mechanical design, the hygiene, the operation and the function, it is convenient to install the covering means in the outside of the aseptic chamber.

As the above-mentioned, a packaging and filling machine of the invention is capable of easily preforming with the forming flaps by keeping the pressure of the filled liquid food in the tube the positive pressure, is capable of preventing the pressure of the liquid food from dropping to negative pressure, even if the pressure of the liquid food decreases due to the up-and-down of the liquid food pressure, and is capable of preventing outside atmosphere materials from invading into the tube.

DESCRIPTION OF THE MARK

1 Packaging material
1c Splice

1d Longitudinal seal zone
1e Gap
7 Filling pipe
20 Covering means
21 Adhesion film patch
22 Separation film
23 Reel
24 Tape
25b Separation roll
26 Push roll
27 Recovery roll
28 Sensor
29 Control means
36 Pressure flange Embodiments of this invention are explained in detail as follows with reference to the drawings.

Figure 1:
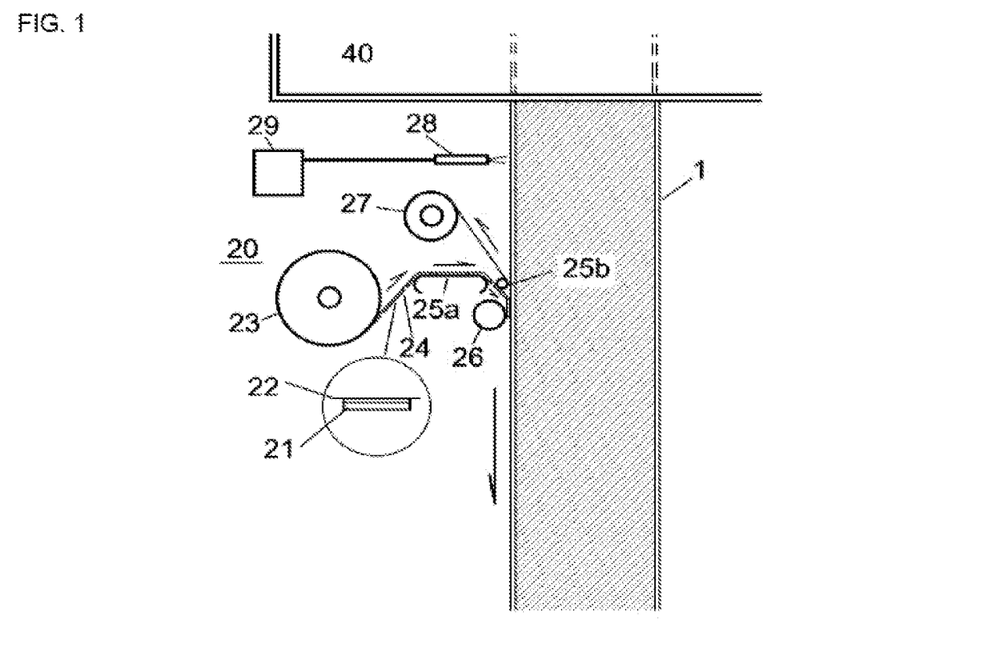
FIG. 1 is an outline front view of the covering means of the packaging and filling machine of Example in accordance with this invention.

In the packaging and filling machine of this embodiment, as shown in FIG. 7, the web-like packaging laminated material 1 is formed to tube shape, the tube overlapped in both ends of the packaging material is longitudinally sealed along the longitudinal direction, as shown in FIG. 8, liquid food is filled up to a liquid level of a predetermined position above the outlet of filling pipe 7 from the filling pipe 7 in the tube-like packaging material conveyed vertically downward in the aseptic chamber 40, while the tube is held with seal jaws 10 and counter jaws 11 along transversal direction, as shown in FIG. 9, the tube 1 is transversally sealed, the tube is held with forming flaps 41, 41 at the same time to be preformed, the tube is cut in the transversal seal zone with knife 42, and preformed containers 13 are manufactured, The outline of the covering means (the film applying means) of the packaging and filling machine of Example 1 in accordance with this invention is shown for FIG. 1.

The covering means 20 of this embodiment is installed in the outside right under the aseptic chamber 40 assuring that liquid food is filled up with a sterilized atmosphere into the tube-shaped packaging material 1.

The installed position is the position above the seal jaw, the counter jaw and the forming flap (not shown in FIG. 1 and in FIG. 9, the seal jaw 10, the counter jaw 11, the forming flap 41, 41).

In the packaging and filling machine of this embodiment, the liquid food pressure drops in the lower part (the downstream) below the installed position of the covering means 20 and provides negative pressure, the covering means 20 is installed in the point of the positive pressure at the upstream side from the point where the negative pressure is provided.

The covering means of Example, or the film applying means 20 comprises a reel 23 of a tape 24 comprising adhesion film patches 21 and a separation film 22 carrying and transporting the adhesion film patches 21, a guide 25a guiding the tape 24 unwound from the reel 23, a separation roll 25b exfoliating the separation film 22 from the adhesion film patches 21, a push roll 26 pressing the adhesion film patches 21 on the gap in the splice of the longitudinal seal, a recovery roll 27 collecting separation film 22, a sensor 28 detecting the splice of the longitudinal seal, a control means 29 controlling the timing when the separation film 22 is exfoliated from the adhesion film patches 21 and the adhesion film patches 21 are pressed on the gap of the splice.

The film applying means 20 provides with the tape 24 comprising adhesion film patches 21 and a separation film 22 carrying and transporting the adhesion film patches 21. The adhesion film patch 21 comprises an adhesion layer and a substrate. In the tape 24, an adhesion layer adheres to the separation film temporarily.

The tape 24 is unwound from the reel 23, and the guide 25a guides the tape 24. In the separation roll 25b, the tape 24 exfoliates the separation film 22 from the adhesion film patches 21. The hard adhesion film patch 21 goes straight to and exfoliates from the flexible separation film 22, because the separation film 22 U-turns at the separation roll 25b.

The straight-going adhesion film patch 21 arrives at outside surface of the tube-like packaging material 1, and attaches on the splice of the longitudinal seal. The attached adhesion film patches 21 are pressed on the gap in the splice of the longitudinal seal by the push roll 26. As a result, by the adhesion film patches 21, the gap is covered.

The separation film 22 is U-turned at the separation roll 25b and the separation film 22 is collected by the recovery roll 27.

In this embodiment, the sensor 28 detecting the splice of the longitudinal seal is equipped. With signals from the sensor 28, the control means 29 decides the timing when the separation film 22 is exfoliated from the adhesion film patches 21, and the adhesion film patches 21 are pressed on the gap of the splice.

Figures 2A, 2B:
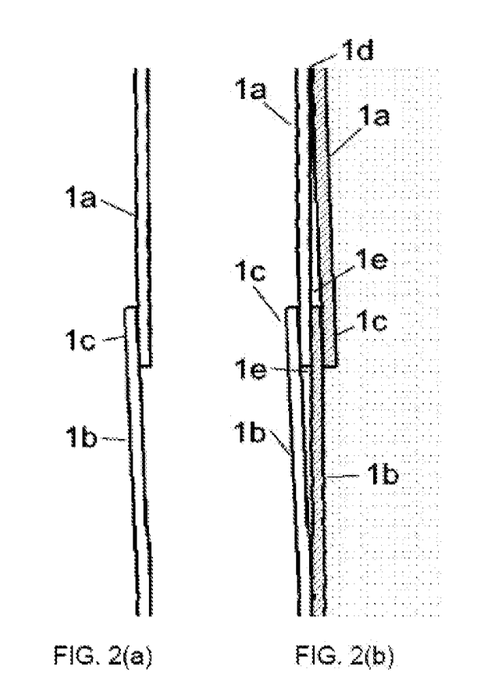
FIGS. 2(a) and 2(b) are sectional views explaining the gap in the splices in the longitudinal seal zone.

FIG. 2 is a sectional view explaining the gap that occurs in the splice of the longitudinal seal zone.

In a packaging and filling machine, it is necessary to splice with next another web-shaped package laminated material, because the web-shaped packaging laminated material has a finite length. FIG. 2(a) shows a longitudinal section of the splice 1c of the web-shaped packaging laminated material 1a, 1b, and they lap over each other at the splice 1c.

Figure 3:
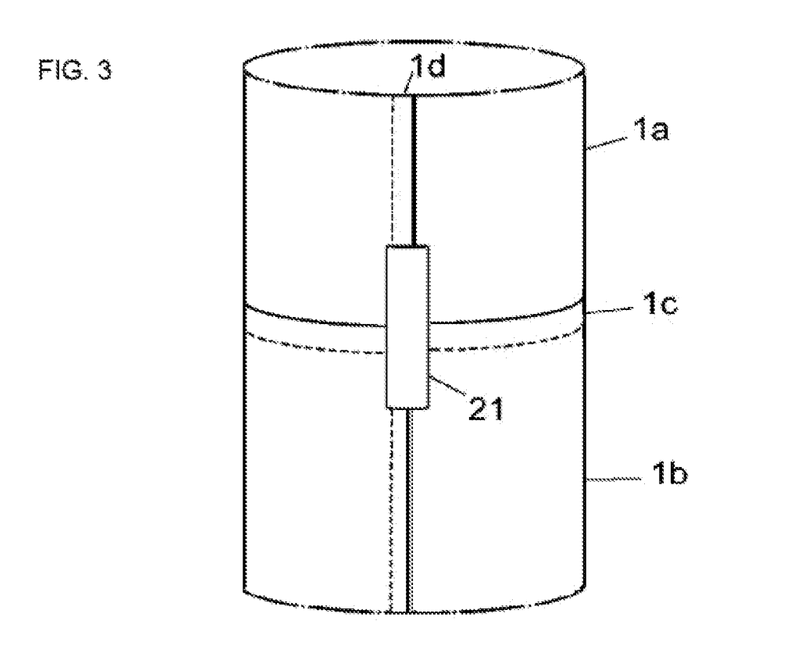
FIG. 3 is an outside drawing showing the paper tube covered with a film by the covering means (the film applying means) of Example on the gap in the splice in the longitudinal seal.

FIG. 3 is the outside drawing showing the paper tube covered with a film by the film applying means of Example on the gap which occurs on the splice in the longitudinal seal.

In this embodiment, the web-like packaging material 1 is formed into tube-shape, and one another with both ends of the packaging material are lapped in the longitudinal direction of the tube are longitudinal sealed, and longitudinal seal zone 1d is formed.

FIG. 2(b) shows the sectional view of the longitudinal seal zone 1d the splice 1c of the web-shaped packaging laminated material 1a, 1b.

Due to over-lap of both ends, the splices 1c of the inner and outer web-shaped packaging laminated material 1a, 1b overlapped. As shown in FIG. 2(b), a gap 1e is formed at the splice 1c. By the gap 1e, the inside of the tube-shaped packaging material 1 might be connected with the outside of the tube-shaped packaging material 1.

The adhesion film patch 21 covers the gap 1e which occurs in the splice 1c of the longitudinal seal 1d with the film applying means 20 of Example, as shown in FIG. 3.

Because the film applying means covers the potential gap or the gap which occurred in the splice of the longitudinal seal zone with the film, any pollutants of external atmosphere substance do not invades from the point and liquid food in the tube is not polluted, and hygiene conditions of contents food are maintained.

Figure 4:
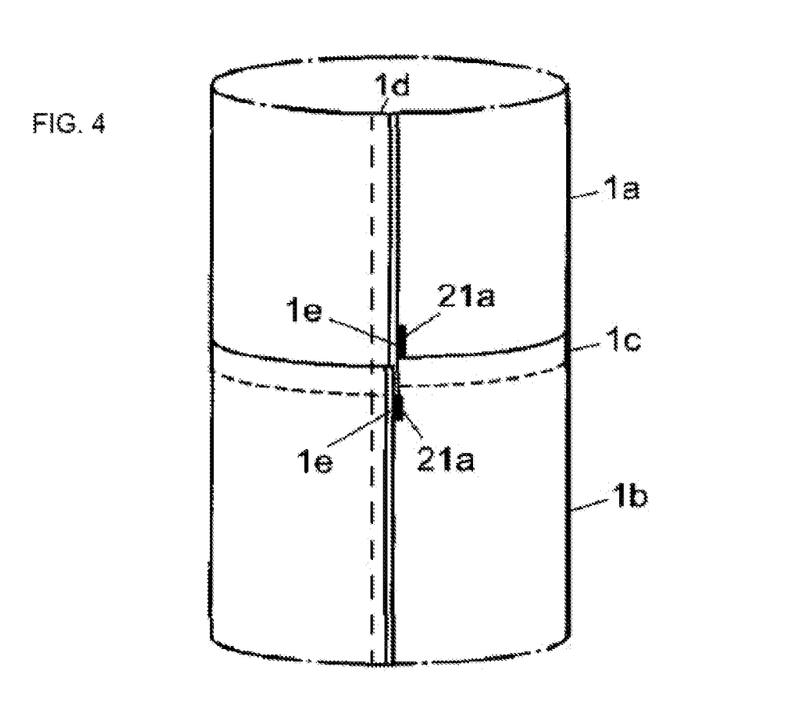
FIG. 4 is an outside drawing showing the paper tube covered with an adhesive by the covering means (the adhesive applicator) of Example on the gap in the splice in the longitudinal seal.

The outside state of covering with the adhesive by the adhesive applying means is shown in FIG. 4.

The adhesive block 21a covers the gap 1e which occurs in the splice 1c of the longitudinal seal 1d of the tube package laminated material 1a, 1b with the adhesive applying means (not shown) of Example, as shown in FIG. 4.

Because the adhesive applying means covers the potential gap or the gap which occurred in the splice of the longitudinal seal zone with the adhesive block 21a, any pollutants of external atmosphere substance does not invade from the point and liquid food in the tube is not polluted, and hygiene conditions of contents food are maintained.

Liquid, viscous, membranous, and film-like adhesive covers the gaps with a roller, nozzle, spraying ingredient, jet injection ingredient.

In addition, the invention is not limited to the above embodiments, the embodiments can be changed based on the object of the invention, and they are not excluded from the scope of the invention.

INDUSTRIAL APPLICABILITY

By the packaging and filling machine of this invention, packaged containers for liquid foods such as milk, juice, mineral water, fluid diet product can be manufactured.

The invention claimed is:

1. A packaging and filling machine, in which a web-like packaging material is fed continually and is formed to a tube shape, the tube overlapped in both ends of the packaging material is longitudinally sealed along the longitudinal direction, a liquid food is filled up to a liquid level of a predetermined position above an outlet of a filling pipe from the filling pipe in the tube-like packaging material conveyed continually and vertically downward, while the tube is held with a seal jaw and a counter jaw along transversal direction below the liquid level, and is pulled down, the tube is transversally sealed, while the tube is held with seal jaws and counter jaws along transversal direction below the liquid level, and the tube is held with forming flaps at the same time to be preformed, the tube is cut in the transversal seal zone, and packaged containers are manufactured, wherein;

the packaging and filling machine comprises a pressure flange being arranged around the periphery of filling pipe below the liquid level in the tube-like packaging material, the pressure flange controls free flows from the lower part to the upper part about the liquid food filled in the tube to keep the pressure of the liquid food in the tube below the pressure flange a positive pressure, and to make the preforming with the forming flaps easy, the packaging and filling machine comprises a covering means, the covering means covers a gap or a potential gap formed in splices of the longitudinal seal zone on the upstream side of points where the liquid food pressure drops due to changes of the liquid food pressure above the seal jaws, the counter jaws and the forming flaps, and the covering means prevents an invasion of external atmosphere substances to the tube due to a dropping to negative pressure of the liquid food pressure by controlling free flows from the lower part to the upper part about the liquid food filled in the tube by the pressure flange.

2. A packaging and filling machine according to claim 1, wherein the covering means is a means of applying a film for covering.

3. A packaging and filling machine according to claim 1, wherein the covering means is a means of applying an adhesive for covering.

4. A packaging and filling machine according to claim 1, wherein the covering means is installed in an outside of an aseptic chamber assuring that the liquid food is filled up in a sterilized atmosphere into the tube-shaped packaging material.

* * * * *